United States Patent [19]

Akkapeddi et al.

[11] Patent Number: 4,611,025

[45] Date of Patent: Sep. 9, 1986

[54] PROCESS FOR THE PRODUCTION OF THERMOPLASTIC COMPOSITIONS CONTAINING THERMOTROPIC OLIGOMERS AND COMPOSITIONS PRODUCED BY SUCH PROCESS

[76] Inventors: Murali K. Akkapeddi, 40 Whitewood Dr., Morris Plains, N.J. 07950; Bruce T. DeBona, 23 Rose Ave., Madison, N.J. 07940; Hsin L. Li, 3 Fernwood Pl., Parsippany, N.J. 07054; Dusan C. Prevorsek, 21 Harwich Rd., Morristown, N.J. 07960

[21] Appl. No.: 720,103

[22] Filed: Apr. 4, 1985

[51] Int. Cl.[4] ............................................. C08K 3/34
[52] U.S. Cl. .................................. 524/449; 524/451; 524/538
[58] Field of Search ................. 524/449, 451, 538

[56] References Cited

U.S. PATENT DOCUMENTS

| | | | |
|---|---|---|---|
| 3,778,410 | 12/1973 | Kuhfuss et al. | 260/47 |
| 3,890,256 | 6/1975 | McFarlane et al. | 260/47 |
| 3,991,013 | 11/1976 | Pletcher | 260/47 |
| 4,048,148 | 9/1977 | Morgan | 260/72.5 |
| 4,066,620 | 1/1978 | Kleinschuster et al. | 260/47 |
| 4,067,852 | 1/1978 | Calundann | 260/47 |
| 4,075,262 | 2/1978 | Schaefgen | 260/860 |
| 4,083,829 | 4/1978 | Calundann et al. | 260/47 |
| 4,118,372 | 10/1978 | Schaefgen | 528/190 |
| 4,130,595 | 12/1978 | Bellis | 260/654 |
| 4,140,669 | 2/1979 | Phipps et al. | 524/451 |
| 4,140,846 | 2/1979 | Jackson, Jr. et al. | 528/193 |
| 4,156,070 | 5/1979 | Jackson, Jr. | 528/191 |
| 4,161,470 | 7/1979 | Calundann | 260/40 |
| 4,272,625 | 6/1981 | McIntyre et al. | 528/183 |
| 4,386,174 | 5/1983 | Cogswell et al. | 524/27 |
| 4,439,578 | 3/1984 | Kim et al. | 524/538 |
| 4,460,731 | 7/1984 | Kochanowski et al. | 524/451 |
| 4,460,735 | 7/1984 | Froix | 524/537 |
| 4,489,190 | 12/1984 | Froix | 524/451 |

OTHER PUBLICATIONS

*J. Macromol. Sci. Phys.,* "Polymer Composites of Rigid and Flexible Molecules: System of Wholly Aromatic and Aliphatic Polyamides", by M. Takayanagi et al., vol. B17(4), pp. 591–615, 1980.

*Primary Examiner*—Lewis T. Jacobs

[57] ABSTRACT

A process of blending two or more polymers having varying viscosities by blending the polymers in the melt in the presence of a solid particulate material to form polymer blends having improved dispersion of the polymer.

46 Claims, No Drawings

PROCESS FOR THE PRODUCTION OF THERMOPLASTIC COMPOSITIONS CONTAINING THERMOTROPIC OLIGOMERS AND COMPOSITIONS PRODUCED BY SUCH PROCESS

BACKGROUND OF THE INVENTION

1. Field of the Invention

The present invention relates to thermoplastic compositions. More particularly, this invention relates to compositions comprising a crystallizable thermoplastic polymer having isotropic (non-liquid crystalline) characteristics having a thermotropic (liquid crystalline in the melt) oligomer dispersed therein. These compositions have improved properties. Another aspect of this invention relates to a process for the production of such compositions, in which a particulate material is used to aid in the dispersion of the thermotropic oligomer in the thermoplastic polymer.

2. Prior Art

Crystallizable isotropic thermoplastics such as polyamides (e.g. nylon-6, nylon-66) and polyesters (e.g. poly(ethylene terephthalate), poly(butylene terephthalate) are relatively inexpensive materials and have gained wide acceptance for general molding films, textiles, yarns and industrial applications. Although most of these materials have mechanical properties suitable for general applications, further improvements to achieve superior properties, such as increased tensile strength, have not been as successful as desired.

Various additives have been proposed for addition to crystallizable isotropic thermoplastic polymers, such as polyamides (e.g. nylon-6) and polyesters (e.g. poly(ethylene terephthalate)) which are intended to improve the physical properties of fibers or films produced therefrom. Such additives include inorganic materials, such as silica which are used as fillers. The loading level of such inorganic fillers in the polymer is usually from about 10% up to about 40% by weight. The primary purpose for inclusion of these materials is to reduce cost, especially for molding parts, and the secondary purpose is to increase the rigidity and thermal stability of the molded parts. However, even though these purposes may be achieved, they are often achieved at the expense of the tensile strength and impact resistance of the polymer. Other additives include small organic compounds such as plasticizers, and other polymers with which the isotropic thermoplastic is coextruded or otherwise blended. While such additives have improved some properties of such isotropic/thermoplastic polymers, such improvement in properties has often been at the expense of other properties.

Recently, a new class of polymers has been discovered which is suitable for high strength service without the need of reinforcing agents and which exhibits a general overall balance of mechanical properties substantially enhanced over previous isotropic polymers. These polymers have been described by various terms including "liquid crystalline", "thermotropic", "liquid crystal", and "anisotropic". Briefly, the polymers of this new class are thought to involve a parallel ordering of molecular chains. The state wherein the molecules are so ordered is often referred to either as the liquid crystal state or the nematic phase of the liquid crystal state. These polymers are prepared from monomers which are generally long, flat and fairly rigid along the long axis of the molecule, and have chain extending linkages that are either coaxial or parallel. Because of the ability of such materials to exhibit anistropic properties (i.e., liquid crystalline properties) in the melt, they can readily form a product having a highly-oriented molecular structure in the shear direction upon melt processing which greatly enhances the strength of the material. Illustrative of such thermotropic polymers are thermotropic polyesters as described, for example, in U.S. Pat. Nos. 4,140,846; 3,778,410; 4,067,852; 4,083,829; 3,890,256; 3,991,013; 4,066,620; 4,075,262; 4,118,372; 4,156,070; 4,130,595; and 4,161,470. Polyazomethanes which are thermotropic are described in U.S. Pat. No. 4,048,148, and thermotropic polyesteramides are described in U.S. Pat. No. 4,272,625.

Proposals have been made to blend these thermotropic materials with isotropic themoplastic polymers to improve the mechanical characteristics of the isotropic polymers. However, in some instances, the resulting blends do not exhibit improved properties but rather exhibit properties which are merely an average of the properties of the isotropic polymer and the thermotropic polymer. For example, U.S. Pat No. 4,460,735 discloses a polymer blend which can be formed into shaped articles allegedly having improved mechanical properties. The polymer blend of this patent comprises approximately 5 to approximately 75 percent by weight, based upon the total weight of the blend, of a polycarbonate and approximately 25 to approximately 95 percent by weight, based upon the total weight of the blend, of a melt-processable wholly aromatic polyester which is capable of forming an anisotropic melt phase apart from the blend. As disclosed in the patent, the properties of these blends are merely an average of the properties of the isotropic and thermotropic polymer, and the isotropic polymer appear to function primarily as a filler for the thermotropic polymer.

Similarly, U.S. Pat. No. 4,386,174 discloses a melt-processable composition comprising at least one polymer capable of forming an anisotropic melt and at least one other melt-processable polymer characterized in that the temperature range over which the polymer can form an anisotropic melt overlaps the temperature range over which the melt-processable polymer may be melt processed. The patent discloses that the melt viscosity of such composition may be very much less than that of the melt-processable polymer in the absence of the anisotropic melt-forming polymer particularly at high shear rates corresponding to those encountered during moulding and extrusion operations. Here again the properties of the blend are merely an average of the properties of the isotropic polymer and thermotropic polymer.

In other situations where attempts have been made to blend thermotropic and isotropic polymers, thermotropic polymers have proved incompatible with isotropic polymers. The resulting heterogeneous blends exhibit properties which are no better than either the thermotropic polymer or the isotropic polymer alone. For example, M. Takayanagi et al. in *J. Macromol. Sci.—Phys.*, B17(4), pp. 591–615 (1980) report attempts to blend nylon-6 or nylon-66 with wholly aromatic polyamides such as poly-p-benzamide or their block copolymers with nylon-6 or nylon-66. The wholly aromatic polyamides used are infusible. Similarly, M. Wellman et al., Division of Coating and Plastics Preprints, *American Chem. Soc.*, vol. 43, pp. 7893–87 (1980) report blending of rod-like polymers with similar coil-like polymers, both having monomers with fused ring structures (e.g. poly-para-phenylene benzobisthiazole and poly-2,5(6) benzimidazole). Again the rigid polymer is infusible.

When a blend or mixture is prepared from two or more ordinary, non-polymeric materials, or from a polymeric material and a non-polymeric material, a random distribution of the molecules of the components is obtained. This random distribution provides complete mixing without the formation of groups or clusters of the molecules of any one component. Such a mixture is expected to follow the "Rule of Mixtures". The Rule of Mixtures predicts the numerical values of the modulus of a blend to be the weighted average of the numerical values of the modulus of the components.

Mixtures of most chemicallly distinct polymeric materials have been found to deviate from the behavior of ordinary mixtures as characterized by the Rule of Mixtures. The sheer size of polymeric chains and varying viscosities of the polymers restrict mixing of the components and leads to the formation of domains or clusters of molecules of the individual components. It is known in literature that in polymer blends viscosities or surface tensions of polymers in the blend affect the dispersion and the particle sizes of the dispersed polymer phase. For example, if a thermotropic polymer which has a very low melt viscosity is melt blended with an isotropic polymer which has a very high viscosity, the resultant blend under microscopic examination will normally show non-uniform distribution, and agglomeration, or coagulation of the dispersed particles of the thermotropic polymers in a continuous phase of the isotropic polymer. This non-uniform blending will result in poorer properties than either of the parent polymers, i.e., either the thermotropic or the isotropic polymer. Thus, it can be said that most chemically distinct polymeric materials tend to be incompatible in mixtures, exhibiting a tendency to separate into phases. There exists a boundary between the domains of the component polymers, and articles made from polymer blends would be expected to exhibit failure at the boundary when placed under stress. In general, then, the mechanical properties of the blend are commonly reduced as compared in the properties of the individual polymers rather than enhanced. Specific properties which may be thus affected include tensile strength, tensile modulus, flexural strength, flexural modulus and impact strength.

Accordingly, there is a need for a process of blending thermotropic and isotropic polymers to form substantially homogeneous blends which have enhanced physical characteristics.

SUMMARY OF THE INVENTION

In accordance with this invention there is provided a process for forming a substantially homogeneous blend of two or more polymers by blending said polymers in the presence of an effective amount of one or more solid particles. The process of this invention is useful for blending polymers having differing viscosities, and is particularly useful for blending an isotropic polymer of film forming molecular weight and a thermotropic oligomer having a molecular weight less than that of the isotropic polymer. In the particularly preferred embodiments, the process of this invention comprises the step of blending an isotropic polymer of film forming molecular weight which has a fusion temperature at a first temperature, has a glass transition temperature and forms an isotropic liquid above the first temperature and an effective amount of oligomer having a melting point at a second temperature, said second temperature being not more than about 50° C. less than said first temperature, nor more than about 70° C. more than said first temperature; said oligomer exhibiting thermotropic behavior between said second temperature and a third temperature, and said third temperature being at least about 30° C. above said second temperature and at least about 10° C. above said first temperature, said oligomer having a length/diameter ratio (L/D) of at least about 10, a glass transition temperature at least about 10° C. greater than the glass transition temperature of said polymer and a Small's solubility parameter within about 7 of the Small's solubility parameter of said polymer in the melt and in the presence of an "effective amount" of an "effective particulate material."

While we do not want to be bound by any theory, it is believed that the separation into phases can be considerably eliminated by the novel introduction of the dispersed particles, such as talc, silica, mica or like inorganic materials. It is believed that the dispersed particles serve as anchors site for the low viscosity thermotropic polymer. The particles are uniformly distributed within the isotropic polymer matrix, therefore, the thermotropic polymers particles are also distributed uniformly within the matrix.

Another aspect of this invention relates to blends prepared in accordance with the process of this invention. Because of the homogeniety of the blend, such blends exhibit one or more improved properties, as for example increased tensile modulus, tensile strength elongation at break, abrasion resistance, resistance to splitting along domain boundaries, and increased draw ratio and extensibility, as compared to more heterogeneous blends. Thus, polymeric blends of this invention can be conveniently used in applications where both increased modulus and strength are of benefit. These materials are especially useful in the manufacture of yarn because enhanced tensile properties can be obtained and increased yarn draw ratios can be used.

DESCRIPTION OF THE PREFERRED EMBODIMENTS

The process of this invention is conveniently carried out by blending, in the melt, a isotropic polymer with an "effective amount" of a suitable thermotropic oligomer in the presence of a "effective amount" of an "particulate material". The manner in which the components are melt blended is not critical and conventional methods can be employed. The order of mixing of the various components of the melt is not critical. Accordingly, the order of addition of the polymers and effective particulate material, and other optional components, to form the mixture can be varied as desired. For example, the melt can be formed through use of conventional polymer and additive melt blending means, in which the polymeric components are heated to a temperature equal to or greater than the melting point of both polymers, and below the degradation temperature of each of the polymers. An effective amount of one or more particulate materials, is added to the melted polymers while at the same time vigorously stirring the melt, or added prior to melting and mixing.

In yet another procedure for forming the melt, a suitable isotropic polymer, thermotropic oligomer and an effective amount of one or more particulate materials are dry blended. This dry blend is then melt extruded in a conventional extruder. Alternatively a dry blend of any two of the components can be formed, and the blend extruded through a convention extruder. The remaining component can then be injected into the melt near the compression zone of the extrusion screw.

In the most preferred embodiment of the invention, the components are granulated, and the granulated components mixed dry in a suitable mixer, as for example a tumbler or a Banbury Mixer, or the like, as uniformly as possible. Thereafter, the composition is melt extruded in an extruder until the polymer components are melted. A premix containing an effective amount of the particulate material, and the thermotropic oligomer can be formulated and this mixture can be added to the melt at or near the compression zone of the extrusion screw.

The process is carried out for a time sufficient to provide the desired blend. Residence times can vary widely depending on the nature of the desired blend. In general, if residence time of the melt blend in the extruder or other device used to form the blend is short, the blend is often not sufficiently homogeneous, and often contains exceedingly large dispersed islands of the oligomer having an average diameter on the order of about 1 micrometer are larger. However, if the residence time of the blend in the extruder or other device used to form the blend is too long, then the thermotropic polymer may degrade, and excessively large islands of the oligomer may be observed in the continuous isotropic polymer phase. In general residence times are from about 1 minute to about 10 minutes.

In the preferred embodiments of the invention, the components are melt blended for a time sufficient to form a "substantially homogeneous blend" of the isotropic polymer and thermotropic oligomer. As used herein a "substantially homogeneous blend" is a blend in which the average size of dispersed islands of thermotropic oligomer in the isotropic polymer matrix is not greater than about 1 micrometer. The homogeniety of the blend, i.e., size of dispersed islands of oligomer can be determined by observing cross-sectioned samples in a microscope, and measuring observed islands of dispersed oligomer. Dynamic mechanical properties can also indicate the degree of homogeniety. For example, the presence of an individial glass (Tg) for the thermotropic oligomer and the isotropic polymer indicates less homogeniety, and a coalescence of these individual Tg's into a single Tg, and increased resolution of same can be indicative of an increasing degree of homogeniety. In the preferred embodiments of the invention, melt blending is continued until the average diameter of the dispersed oligomer is equal to or less than about 0.75 micrometers. In the particularly preferred embodiments, melt blending is continued until the averge diameter of the dispersed oligomer in the continuous isotropic polymer phase is equal to or less than 0.5 micrometers. Amongst these particularly preferred embodiments of the invention most preferred are those embodiments in which no domain structure, i.e. oligomeric phase dispersed in isotropic phase, can be observed using an optical microscope at a magnification equal to or less than about 40,000×.

A broad spectrum of isotropic polymers can be used in the conduct of the process of this invention. In the present invention "isotropic polymers" are used in the conventional manner. The only requirements are that the isotropic polymers have a glass transition temperature and a fusion temperature and act as an isotropic (non-liquid crystalline) liquid above its fusion point. In the case of crystalline polymers, the fusion temperature is referred to as the melting point of the polymer. Isotropic polymers useful in the conduction of this invention are thermoplastics that can be heated and softened. Illustrative of such polymers are polyamides such as the copolyamide of 30% hexamethylene diammonium isophthalate and 70% hexamethylene diammonium adipate, the copolyamide of up to 30% bis-(p-amidocyclohexyl) methylene, terephthalic acid and caprolactam, polyemthphenylene isophthalamide poly(p-phyenylene terephthalamide), polyhexamethylene adipamide (nylon-66) poly(butyrolactam) (nylon-4), poly(enantholactam) (nylon-7), poly(capryllactam) (nylon-8), polycaprolactam (nylon-6), polyhexamethylene sebacamide (nylon-610), polyaminoundecanamide (nylon-11), polydodecanolactam (nylon-12), polyhexamethylene isophthalamide, polyhexamethylene terephthalamide, polycaproamide, or combinations thereof; polyesters such as poly(ethylene terephthalate), poly(ethyleneadipate), poly(tetramethylene isophthalate), poly (1,4-cyclohexane dimethylene terephthalate), poly(ethylene 1,5-naphthalate), poly(butylene terephthalate), poly(ethylene sebacate), poly(ethylene isophthalate) and the like; polycarbonates such as poly[2,2-propane bis-(4-phenylcarbonate], poly[methane bio-(4-phenyl) carbonate], poly[1,1-ethane bis-(4-phenyl) carbonate], poly[2,2-butane bis-(4-phenyl)-carbonate] and the like; polyurethanes; polyethers; such as substituted polyphenylene oxides, polyalkylene or the like or unsubstituted polysulfones; polysulfides; polyestercarbonates; polyether sulfones, cellulosics; polysulfides poly phenyloxides; polyacetates such as polyvinyl acetate, and polymers of $\alpha,\beta$-unsaturated olefins such as polypropylene, polyvinyl chloride, polystyrene, poly(methylacrylate), poly(methyl methacrylate), polyacrylo nitrile, polyvinyl alcohol, and the like.

The invention is particularly applicable to polyesters such as poly(alkylene terephthalate) polymers having alkylene of moieties of from about 2 to about 4 carbons, such as poly(ethylene terephthalate) (PET) and poly(butylene) terephthalate (PBT); poly(cycloalkylene terephthalate) polymers having from 5 to 7 carbon atoms, such as poly(1,4-cyclohexane terephthalate). The corresponding isophthalate derivatives of the above listed polyesters such as poly(ethylene isophthalate) are also particularly useful in the practice of this invention. It is also particularly applicable to polyamides such as the nylon-6, nylon-66, nylon-12, nylon-11, and the like, which can be constructed from aliphatic monomers which are either diacids or diamines, or are aminoacids, or have combinations of all three monomers. The above listing of thermoplastics polymers which can be used in the practice of this invention is provided for illustrative purposes only, and other thermoplastic polymers may be used.

As noted above, the other polymeric component is an thermotropic polymer, having a viscosity which differs from that of the other isotropic polymeric component. To obtain the blend of this invention which exhibits enhanced properties, the selection of the appropriate thermotropic oligomer is critical. The salient features of oligomers used in any situation are its melting point, its temperature range for thermotropic behavior, its glass transition temperature, its Small's solubility parameter and how these features relate to the thermoplastic polymer of choice. The oligomer should exhibit thermotropic behavior, i.e., liquid crystalline or anisotropy in the melt, between about the second temperature and a third temperature. Thus the second temperature represents a transition between the solid state and the nematic liquid crystalline state. The third temperature should be at least about 30° C. above the second temperature and at least about 10° C. above the first temperature. That is, for example, if the polymer's fusion temperature is about 250° C. and the oligomer's melting point is about 270° C., thermotropic behavior should be exhibited by the oligomer between about 270° C. and about 300° C. If, however, the polymer's fusion temperature is about 250° C. and the oligomer's melting point is about 220° C., thermotropic behavior should be exhibited between about 220° C. and about 260° C.

The oligomer should also have a glass transition temperature at least about 10° C. and preferably at least about 25° C. above the glass transition temperature of the isotropic polymer. This enables the composition to exhibit a glass transition temperature higher than that of the isotropic polymer alone, and thus improve the dimensional stability of the composition.

Generally, useful oligomers will have a length to diameter ratio of at least about 10. In the preferred embodiments, the length to diameter ratio of the thermotropic oligomer is in the range of from about 10 to about 100, and in the particularly preferred embodiments is in the range of from about 15 to about 75. Amongst these particularly preferred embodiments, most preferred are those embodiments in which the length to diameter ratio of the oligomer is from about 20 to about 50.

Finally, the oligomer and polymer should have monomers which enhance their compatibility in a chemical sense even though the rod-like nature of the oligomer may prevent true compatibility, at least under equilibrium conditions. A convenient measure of mutual compatibility of the two materials is the Small's solubility parameter calculated in accordance with the Small's Table of Molar Attraction Constants (P. A. Small, *J. Appl. Chem.*, vol. 3, 71 (1973). In general, the Small's parameter of the oligomer is within about 7 of the Small's parameter of the isotropic polymer. In the preferred embodiments, the difference in Small's parameters is not greater than about 5, and in the particularly preferred embodiments is not greater than about 4. Amongst these particularly preferred embodiments, most preferred are those embodiments in which the difference in Small's parameter is not greater than about 2.

The type of oligomers used in the process of this invention can vary widely depending to a significant extent on the type of thermoplastic polymer used, and upon the desired characteristics in the blend. In general, such materials will have a molecular weight of from about 500 to about 25,000, and preferably from about 750 to about 15,000. In the particularly preferred embodiments, the oligomer will have a molecular weight in the range of from 800 to about 10,000, and in the most preferred embodiments of the invention will have a molecular weight in the range of from about 900 to about 6000. Ideally, the molecular weight of the oligomer will vary from about 1000 to about 4000. With these low molecular weights, the neat oligomer is usually weak, and is not useful for fabrication into products where strength is required, such as fibers, films, or molded parts.

Thermotropic oligomers for use in this invention can vary widely provided that they are thermotropic and possess the molecular weight, L/D ratios, glass transition temperatures and fusion temperatures described above. Illustrative of useful oligomers are oligomeric forms of the polymers described in U.S. Pat. Nos. 4,371,660; 4,107,143; 4,377,681; 4,294,955; 4,374,228; 4,370,466; 4,330,457 and 4,272,625, which possess the molecular weight and L/D ratio, glass transition temperatures and melting or fusion temperatures as specified above.

In the preferred embodiments of the invention, thermotropic oligomer is an aromatic polyester or polyamide. Such polyester oligomers are preferred, especially when the polymer is a polyester such as polyethylene terephthalate. Particularly preferred oligomers have monomers selected from those of the formulae:

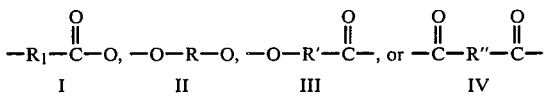

wherein $R_1$ R, R' and R'' are individually 1,4-phenylene, 2,5-napthhalene, 2,6-naphthalene, 1,4-cyclohexyl, 4,4'-biphenyl, 2,6-anthracene-9,10-dione or any of them substituted by alkyl, aryl, fluoro, chloro, bromo or alkoxy. Amongst these particularly preferred embodiments, most preferred are those in R, R' and R'' are individually terephthaloyl or substituted terephthaloyl, substituted hydroquinone and an additional biphenyl where R is 4,4'-biphenyl or hydroquinone, either unsubstituted or substituted with one or more methyl, chloro or tert-butyl groups.

With polyamide isotropic polymers, preferred oligomers include N-substituted polyamides; aromatic polyesters, such as those described above for use with polyester; aromatic poly(ester amides); and aromatic poly(ether amides). In the particularly preferred embodiments, oligomers of choice for use with polyamides are the polyesters described above for use with isotropic polyesters.

The nature and amount of the oligomer should be sufficient to improve all or a portion of the mechanical properties of the composition, i.e. modulus, compared to the polymer alone, especially at high temperatures such as at the glass transition temperature of the polymer. While modulus may be measured by various techniques including tensile modulus (Instron Tensile Tester) or dynamic modulus (Dynamic Mechanical Analyzer), it is convenient to measure tensile modulus. In such a test, the tensile and/or the dynamic modulus of the composition at the glass transition temperature of the thermoplastic polymer should be at least about 10% or greater, preferably at least about 25% or greater, and more preferably at least about 30% or greater than the modulus of the isotropic polymer alone. Such compositions will also exhibit smaller proportional increase in modulus at lower temperatures including room temperature, and increasingly greater proportional increases in modulus at higher temperatures.

An "effective amount" of the thermotropic oligomer is employed. As used herein an "effective amount" of such oligomer is an amount which is effective to improve at least one of the mechanical properties of the thermoplastic polymer to any extent. In the preferred embodiments using preferred thermoplastic materials and oligomers, the amount of oligomers blended with the thermoplastic polymer is at least about 2 percent by weight of the blend, and in the particularly preferred embodiments is from about 2 to about 20 weight percent on the aforementioned basis. Amongst these particularly preferred embodiments, most preferred are those embodiments in which the amount of oligomer is from about 4 to about 9 weight percent on the aforementioned basis.

The oligomeric and polymeric components are blended in the presence of a "dispersing effective amount" of an "effective particulate material". As used herein, an "effective particulate material" is an inert inorganic material which is effective to enhance the dispersion of the thermotropic oligomer in the thermoplastic polymer to any extent. Effective dispersing agents used in the conduct of the process of this invention are preferably finely divided inert inorganic materials. Such materials may be selected from a wide variety of minerals, metals, metal oxides, siliceous materials, metal salts, and materials thereof. Examples of materials include glasses, glass fibers, titania, zirconia, alumina, feldspar, silicon carbide, asbestos, talc, calcium carbonates, clay, carbon black, quartz, novaculite and other forms of silica, kaolinite, bentonite, garnet, mica, saponite, beidellite, and the like. The foregoing recited materials are illustrative only and are not meant to limit the scope of the materials that can be utilized in this invention. Siliceous materials or silicates are preferred dispersants, and talc is particularly preferred.

The particle size of effective particulate material employed is critical. In general, the average particle size should not exceed about 7 microns. In the preferred embodiments, average particle size is not greater than about 5 microns, and in the particularly preferred embodiments, average particle size is not greater than about 2 microns. Amongst these particularly preferred embodiments, most preferred are those embodiments in which average particle size is not greater than about 1.5 microns.

The amount of the effective particulate materials employed is critical. A "dispersing effective amount" of the effective particulate material is used. As used herein "a dispersing effective amount" is an amount which is sufficient to enhance the dispersion of the oligomer in the host thermoplastic polymer to any extent. The amount of the material employed will vary greatly, depending on the oligomer, polymer, and the like. If too little of the material is employed, substantially homogeneous blends do not result, and if too much is added, characteristics can be adversely affected. Generally, the amount of material added will be at least about 0.05 weight percent and not more than about 10 weight percent based on the total weight of the blend. In the preferred embodiments of this invention, the quantity of the one or more of the materials employed is at least about 0.1 weight percent and not more than about 5 weight percent, based on the total weight of the mixture. In the particularly preferred embodiments of this invention, the weight percent of the materials is in the range of from about 0.1 to about 1 weight percent. Amongst these particularly preferred embodiments, those embodiments in which the quantity of the materials employed is from about 0.15 to about 0.5 weight percent based on the total weight of the mixture are most preferred. Blends prepared by the process of this invention can be fabricated into useful products using conventional procedures known to those of skill in the art.

Polymer blends prepared in accordance with this invention are extremely useful in the manufacture of such products as tire cord in pneumatic tires, filaments, yarns and the like, and such products, produced therewith have significantly better properties than those produced from the thermoplastic polymer alone. For example, the fibers have increased tenacity, greater breaking strength and greater resistance to depolymerization. When yarn produced from a polymer blend prepared by the process of this invention is made into tire cord and the cord is then used for pneumatic tire reinforcement, the life span of the tire is increased over that of tires reinforced with cord made from other polymers or polymer blends.

The following specific examples are presented to more particularly illustrate the invention, and should not be construed as being limitations on the scope and spirit of the invention.

EXAMPLE I

Preparation of Poly(methyl hydroquinone terephthalate-co-2,6-naphthalene dicarboxylate)

A solution of methyl hydroquinone (1347.1 g; 10.85 moles) and o-cresol (93.9 g, 0.868 moles) in pyridine (2.569 L) and methylene dichloride (5.37 L) was charged into a 50 L flask which had been purged with nitrogen. In a separate flask fitted with a stirrer and reflux condensor was prepared a solution of 2,6-naphthalene dicarbonyl chloride (1542.2 g, 7.596 moles), and terephthaloyl chloride (1542.2 g, 7.596 moles) in methylene chloride (15.14 L) and dimethoxyethane (2.8 L). The mixture was heated to reflux, filtered hot, and the warm solution (38°–40° C.) was added dropwise with stirring to the first solution in the reaction flask. After the addition was complete, the contents were stirred for an additional two hours. The reaction mixture in the form of a slurry was added to excess isopropanol (6 L) with agitation. The precipitated oligomer was isolated by centrifugation, washed repeatedly with hot water and re-isolated by centrifugation. The oligomer was dried in a vacuum oven at $\sim 100°$ C. The final yield of dry oligomer was 2845 g (96%). The oligomer had $\eta$ sp/c$\simeq$0.6 dl/g (in phenol-TCE). Visual examination under a hot-stage microscope equipped with crossed polavizer showed that the material is thermotropic from $\simeq$230° C. to the decomposition point of $\simeq$350° C. DSC analysis (heating rate=20° C./min.) shows a Tg at 97° C. and a small broad melting double at 232° and 255° C.

EXAMPLE II

A number of oligomers having varying molecular weights were prepared as follows:

A 50 liter glass reactor equipped with a mechanical stirrer, thermoprobe, dry-ice condenser and water jacket bath at 20° C. is charged with Solution A which is composed of: methylhydroquinone (1347 g, 10.85 moles), o-cresol (23.4 g, 0.217 mole), pyridine (2569 mL) and methylene chloride (5370 mL). Solution B, which consists of: terephthaloyl chloride (1542 g, 7.59 moles), 2,6-naphthalene dicarboxylic acid chloride (824 g, 3.25 moles), 1,2-dimethoxyethane (2800 mL) and methylene chloride (15140 mL), is prepared by gentle refluxing in an appropriate glass vessel equipped with reflux condenser and heating mantle. This solution is then filtered while hot to remove insoluble residues. The clear filtrate is maintained at gentle reflux to keep the naphthalene diacid chloride from crystallizing.

Solution B is then metered into the reaction vessel containing the vigorously stirred Solution A at such a rate to maintain a temperature between 30° and 38° C. This addition generally requires 30 to 60 minutes. After addition is complete, the pot temperature is allowed to slowly decrease without external cooling but with continued vigorous agitation for 20 to 24 hours.

The oligomeric product is isolated by precipitation of the formed slurry into 150 liters of 2-propanol under vigorous agitation. The finely divided solid is collected by either varuum filtration or centrifuging in a basket type centrifuge. The collected product is purified by washing in 10 liters of fresh 2-propanol followed by centrifuging. The product is further purified by four successive 100 liter water washers at 98° C. The final product is then dried in a vacuum oven at 100° C. and 2 mm pressure until constant weight is achieved. The final yield is between 90 and 96%.

The product is characterized by measurements of solution viscosity and determination of the softening point and thermotropic behavior under a polarized hot stage microscope. Preparations following Example II typically have an sp/C=0.4 dl/g to 0.9 dl/g at C=0.5 in phenol-TCE at 23° C.

Examination of the pure oligomer powder under the hot stage microscope shows a transition to a viscous fluid which displays typical birefringence behavior under shear at 230°-260° C. This birefringence persists up to at least 320° C.

EXAMPLE III

Melt Blending of Nylon 6 and Thermotropic Oligomer Blends

General Procedure:

Nylon-6 chips having a number average molecular weight of 30,000 were melt spun using a screw-type Sterling extruder with a length to diameter ratio of 21 to 1. The barrel and spinnerette temperatures were maintained at 520° F. (271.1° C.) and 505° F. (262.8° C.), respectively. The spinnerette used had 12 holes, each hole had a capillary diameter of 0.010 inch ($0.025^4$ cm) and a length of 0.035 inch (0.089 cm). A cross flow air quenching system was used and the air temperature was 17° C. The nylon 6 chips were dry blended with talc powder having an average diameter of 1.5 microns. The dry blend was extruded through the Sterling extruder. A mini-extruder of 0.25 inch (0.635 cm) in screw diameter×6.25 inches (15.88 cm) in screw length was used to inject a melt of the thermotropic oligomer of Example I at a temperature of 260° C. directly into the molten flow of nylon 6. Sufficient oligomer was added to provide a mixture containing 94.1 weight percent Nylon 6, 5.7 weight percent of oligomer and 0.2 weight percent talc. The point of injection was located at a distance approximately 5 inches (12.7 cm) away from the tip of the screw. The extrusion rate of nylon 6 and the injection rate of thermotropic oligomer were 16 gm/minute and 0.96 gm/minute, respectively. The injection pressure of the 0.25 inch (0.635 cm) diameter mini-extruder was 1000 psi (6890 kPa) while the extrusion pressure of the homogeneous mixture between nylon-6 and thermotropic oligomer of Example I was 1,500 psi (10335 kPa). The total residence time of thermotropic oligomer within the 0.25 inch (0.635 cm) mini-extruder and 1 inch (2.54 cm) diameter extruder was about four minutes and no degradation of the oligomer was observed during extrusion.

A screen pack was installed on the top surface of the spinnerette plate to further increase the mixing of the nylon-6 and thermotropic oligomer of Example I. The screen pack consisted of (90 mesh+200 mesh+200 mesh+400 mesh +400 mesh+200 mesh+200 mesh+90 mesh) with a total of eight layers. In addition to the improvement of mixing due to the use of the screen pack, yarn uniformity was also improved. A heated sleeve, 3 inches (7.62 cm) in diameter×4.5 inches (11.43 cm) in length, was installed at the bottom of the spinnerette plate. The temperature of the heated sleeve was 100° C. The molten yarn emerging from the spinnerette holes had a jet velocity of 83 feet per minute (0.42 meters per second). The take up speed was 1,300 feet per minute (6.604 meters per second) and the melt draw down ratio, defined as take up speed/jet velocity, was 15.6. The take up yarn had 382 denier, 12 filaments, zero twist. The yarn was coated with approximately 5% by weight of a textile finish agent. The yarn was drawn over a heating block at 175° C. and a cold pin at room temperature.

The yarn was drawn in two stages using heated godet rolls. The roll temperatures are: 84° C., 173° C. and 30° C. for inlet #1 roll, #2 roll and draw roll, respectively. The roll speeds are: 420 ft./min. (2.13 m/sec.) 1,450 ft./min. 7.37 m/sec.) and 2,520 ft./min. (12.89 m/sec.) for inlet roll #1, #2 roll and draw roll, respectively.

The yarn was drawn to a maximum draw ratio of 6x. The ultimate tensile strength (UTS), tensile modulus (TM) and ultimate elongation to break (UE) of the yarn were determined. The results of these evaluations are as follows: UTS=9.3 gpd, TM=62 gpd and UE=13%. Photomicrographs of the drawn yarn cross-sections were taken and indicated the general lack of separate oligomeric phases.

COMPARATIVE EXAMPLE I

Nylon 6 control yarn was spun under identical conditions as described in Example I except no thermotropic oligomer and no solid particles were used. The spun yarn of 390 deniers/12 filaments was drawn to a maximum draw ratio of 4×. The tensile properties were: tensile strength=8.1 gpd and tensile modulus=40 gpd and elongation at break=16%.

COMPARATIVE EXAMPLE II

Comparative Example I was repeated except no solid particles were used. The spun yarn could only be drawn to a maximum of 5.5× and the tensile properties were: tensile strength=8.8 gpd, tensile modulus=58 gpd and elongation at break=14%. Photomicrographs under 45,000× magnification indicated non-uniform distribution of the thermotropic oligomer particles in the continuous nylon 6 phase, as well as oligomer particle sizes up to 0.5 micrometers.

What is claimed is:

1. A polymer blending process which comprises blending a polyamide of high molecular weight which has a fusion temperature at a first temperature, has a glass transition temperature and forms as isotropic liquid above the first temperature, an effective amount of an oligomer having a melting point at a second temperature, said second temperature being not more than 50° C. less than said first temperature, nor more than 70° C. more than said first temperature, said oligomer exhibiting thermotropic behavior between said second temperature and a third temperature, said third temperature being at least about 30° C. above said second temperature and at least about 10° C. above said first temperature, said oligomer having a length to diameter ratio (L/D) of at least about 10, a glass transition temperature at least abut 10° C. greater than the glass transition temperature of said polymer, and a Small's solubility parameter within about 7 of the Small's solubility parameter of said polymer in the melt and in the presence of a blending effective amount of an effective particulate material for a time sufficient to form a substantially homogeneous blend of said isotropic polymer and said thermotropic oligomer.

2. A process according to claim 1 wherein said particulate material is selected from the group consisting of finely divided inert inorganic material.

3. A process according to claim 2 wherein said material is talc or mica.

4. A process according to claim 1 wherein the amount of said material is from about 0.05 to about 10 weight percent based on the total weight of the blend.

5. A polymer blending process which comprises blending a isotropic polymer of high molecular weight which has a fusion temperature at a first temperature, has a glass transition temperature and forms an isotropic liquid above the first temperature, an effective amount of an oligomer having a melting point at a second temperature, said second temperature being not more than 50° C. less than said first temperature, nor more than 70° C. more than said first temperature, said oligomer exhibiting thermotropic behavior between said second temperature and a third temperature, said third temperature being at least about 30° C. above said second temperature and at least about 10° C. above said first temperature, said oligomer having a length to diameter ratio (L/D) of at least about 10, a glass transition temperature at least about 10° C. greater than the glass transition temperature of said polymer, and a Small's solubility parameter within about 7 of the Small's solubility parameter of said polymer in the melt and in the presence of a blending effective amount of an effective partculate material for a time sufficient to form a substantially homogeneous blend of said isotropic polymer and said thermotropic oligomer.

6. A process according to claim 5 wherein said isotropic polymer is selected from the group consisting of polyesters and polyamides.

7. A process according to claim 6 wherein said polymer has residues of the formula:

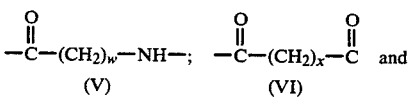

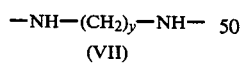

wherein w, x and y are each independently integers from 4 to 16 and wherein the moles of V equal the moles of VII.

8. A process according to claim 1 wherein said polyamide is selected from the group consisting of Nylon 6, Nylon 66, Nylon 12, Nylon 11 and Nylon 610.

9. A process according to claim 8 wherein said polyamide is Nylon 6.

10. A process according to claim 9 wherein said oligomer is a thermotropic polyamide.

11. A process according to claim 9 wherein said oligomer is a thermotropic polyester.

12. A process according to claim 9 wherein said oligomer is a thermotropic poly(ester amide).

13. A process according to claim 9 wherein said oligomer is a thermotropic poly(ether amide).

14. A process according to claim 6 wherein said isotropic polymer is a polyester.

15. A process according to claim 14 wherein said polyester is selected from the group consisting of poly(alkylene terephthalates), poly(cycloalkylene terephthalates), poly(alkylene isophthalates), and poly(cycloalkylene isophthalates.)

16. A process according to claim 15 wherein said polyester is poly(alkylene terephthalates) wherein the alkylene moiety is from about 2 to about 4 carbon atoms.

17. A process according to claim 16 wherein said polyester is poly(ethylene terephthalates).

18. A process according to claim 1 wherein said oligomer is a polyester having residues selected from:

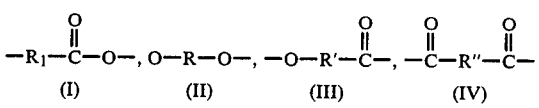

wherein $R_1$, R, R' and R'' are individually 1,4-phenylene; 2,5-naphthalene; 2,6-naphthalene; 1,4-cyclohexyl; 4,4'-biphenyl; or 2,6-anthracene-9,10-dione, either substituted or unsubstituted with one or more alkyl, aryl, fluoro, chloro, bromo, or alkoxy groups.

19. A process according to claim 18 wherein said residues are terephthaloyl or substituted terephthaloyl, substituted hydroquinone and an additional biphenol wherein R is 4,4'-biphenyl or hydroquinone, each unsubstituted or substituted by methyl, chloro or t-butyl.

20. A process according to claim 19, wherein said residues are terephthaloyl and substituted hydroquinone.

21. A process according to claim 20 wherein said residues are substituted terephthaloyl, substituted 4,4'-dihydroxybiphenyl and substituted hydroquinone.

22. A process according to claim 20 wherein said residues are terephthaloyl, 2,6-naphthalenedicarboxyl and substituted hydroquinone.

23. A process according to claim 20 wherein said substituted hydroquinone is methylhydroquinone.

24. A process according to claim 18 wherein said residues are terephthaloyl or 2,6-naphthalenedicarboxyl, p-hydroxybenzoate and substituted hydroquinone.

25. A process according to claim 1 wherein L/D ratio is between about 10/1 and about 75/1.

26. A process according to claim 25 wherein said L/D ratio is between about 15/1 and about 75/1.

27. A process according to claim 26 wherein said L/D ratio is between about 20/1 and about 50/1.

28. A process according to claim 1 wherein the Small's solubility parameter of said oligomer is within about 5 of the Small's solubility parameter of said polymer.

29. A process according to claim 28 wherein the Small's solubility parameter of said oligomer is within 4 of the Small's solubility parameter of said polymer.

30. A process according to claim 29 wherein the Small's solubility paratmeter of said oligomer is within about 2 of the Small's solubility parameter of said polymer.

31. A process according to claim 1 wherein the glass transition temperature of said oligomer is at least 20° C. greater than that of said polymer.

32. A process according to claim 5 wherein said particulate material is selected from group consisting of finely divided inert inorganic material.

33. A process according to claim 5 wherein said particulate material is talc or mica.

34. A process according to claim 33 wherein said particulate material is talc.

35. A process according to claim 5 wherein the amount of said material is from about 0.05 to about 10 weight percent based on the total weight of the blend.

36. A process according to claim 35 wherein said amount is from about 0.1 to bout 5 weight percent.

37. A process according to claim 36 wherein said amount is from about 0.1 to about 1 weight percent.

38. A process according to claim 37 wherein said amount is from about 0.15 to about 0.5 weight percent.

39. A process according to claim 5 wherein the average particle size of said material is not greater than about 7 microns.

40. A process according to claim 39 wherein said size is not greater than about 5 microns.

41. A process according to claim 40 wherein said size is not greater than 2 microns.

42. A process according to claim 41 wherein siad size is not greater than about 1.5 microns.

43. The process according to claim 1 wherein the amount of oligomer is at least about 2 percent by weight of the blend.

44. A process according to claim 43 wherein said amount is from about 2 to about 20 weight percent.

45. A process according to claim 44 wherein said amount is from about 4 to about 9 weight percent.

46. A polymer blend prepared in accordance with the process of claim 5.

* * * * *